(12) United States Patent
Song et al.

(10) Patent No.: US 12,427,844 B2
(45) Date of Patent: Sep. 30, 2025

(54) BATTERY PACK HOUSING, BATTERY PACK AND VEHICLE

(71) Applicant: BYD COMPANY LIMITED, Guangdong (CN)

(72) Inventors: Na Song, Shenzhen (CN); Liangwen Tan, Shenzhen (CN); Jing Tan, Shenzhen (CN); Wenhui Chen, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 539 days.

(21) Appl. No.: 17/984,044

(22) Filed: Nov. 9, 2022

(65) Prior Publication Data

US 2023/0067415 A1    Mar. 2, 2023

Related U.S. Application Data

(63) Continuation of application No. PCT/CN2021/093197, filed on May 12, 2021.

(51) Int. Cl.
*B60K 1/04* (2019.01)
*B60L 50/64* (2019.01)
(Continued)

(52) U.S. Cl.
CPC .............. *B60K 1/04* (2013.01); *B60L 50/64* (2019.02); *B60R 16/0215* (2013.01);
(Continued)

(58) Field of Classification Search
CPC ............. B60K 1/04; B60K 2001/0438; H01M 2220/20; H01M 50/249; H01M 50/298;
(Continued)

(56) References Cited

U.S. PATENT DOCUMENTS

2019/0393459 A1    12/2019    Wesche et al.
2021/0175480 A1*   6/2021    White ................. H01M 50/209

FOREIGN PATENT DOCUMENTS

CN    105794017 A    7/2016
CN    109742281 A    5/2019
(Continued)

OTHER PUBLICATIONS

English Translation of International Search Report from PCT/CN2021/093197 dated Aug. 12, 2021 (3 pages).

*Primary Examiner* — Jason D Shanske
*Assistant Examiner* — James J Triggs
(74) *Attorney, Agent, or Firm* — Calfee, Halter & Griswold LLP (57) ABSTRACT

A battery pack housing includes a tray, a middle beam, a cover plate and a mounting member. The tray includes a bottom plate and a plurality of side beams and forms a receiving space for accommodating a battery unit. The receiving space is open at one side. The cover plate is configured to close the open side of the receiving space. The plurality of side beams include two first side beams opposite to each other. The middle beam is in the receiving space and two ends of the middle beam along a length direction are respectively spaced by a predetermined distance from or in contact with the two first side beams.

19 Claims, 3 Drawing Sheets

(51) Int. Cl.
  *B60R 16/02* (2006.01)
  *H01M 50/209* (2021.01)
  *H01M 50/249* (2021.01)
  *H01M 50/262* (2021.01)
  *H01M 50/271* (2021.01)
  *H01M 50/298* (2021.01)

(52) U.S. Cl.
  CPC ....... *H01M 50/209* (2021.01); *H01M 50/249* (2021.01); *H01M 50/262* (2021.01); *H01M 50/271* (2021.01); *H01M 50/298* (2021.01); *B60K 2001/0438* (2013.01); *H01M 2220/20* (2013.01)

(58) Field of Classification Search
  CPC ... H01M 50/224; H01M 50/293; B60L 50/64; B60L 50/66
  See application file for complete search history.

(56) References Cited

FOREIGN PATENT DOCUMENTS

| | | |
|---|---|---|
| CN | 209071470 U | 7/2019 |
| CN | 110165116 A | 8/2019 |
| CN | 209747594 U | 12/2019 |
| CN | 210006806 U | 1/2020 |
| JP | 2013157242 A | 8/2013 |
| WO | 2020044792 A1 | 3/2020 |

* cited by examiner

BATTERY PACK HOUSING, BATTERY PACK AND VEHICLE

CROSS-REFERENCE TO RELATED APPLICATIONS

This application is a bypass continuation of National Stage of PCT International Application No. PCT/CN2021/093197, filed on May 12, 2021, which claims priority to and benefits of Chinese Patent Application No. 202010470527.6, filed on May 28, 2020. The entire content of the above-referenced application is incorporated herein by reference.

FIELD

This application relates to the field of batteries, and in particular to a battery pack housing, a battery pack using the battery pack housing, and a vehicle with the battery pack.

BACKGROUND

In vehicles where a battery pack is used as the power source or as one of the power sources, the battery pack is often provided with a tray.

SUMMARY

A first aspect of embodiments of this application discloses a battery pack housing, which is configured to accommodate a battery unit and mounted to a transverse beam of a vehicle body. The battery pack housing includes a tray, including a bottom plate; and a plurality of side beams, where the plurality of side beams are sequentially connected end to end and engaged to the bottom plate to form a receiving space which opens on one side for accommodating the battery unit; and the plurality of side beams include two first side beams arranged opposite to each other; a middle beam, located in the accommodating space, where two ends of the middle beam along a length direction are respectively spaced by a predetermined distance from or in contact with the two first side beams; and the length of the middle beam is greater than a projection dimension of the battery unit along the length direction of the middle beam; a cover plate, configured to close an open side of the receiving space; and a mounting member, configured to sequentially extend through and fix the bottom plate, the middle beam and the cover plate, and also configured to be connected and fixed to the transverse beam of the vehicle body.

In the battery pack housing, battery pack and vehicle of this application, the mounting member extends through the bottom plate, the middle beam and the cover plate of the tray, and is then connected and fixed to the transverse beam of the vehicle body. As such, the middle beam of the battery pack housing and the transverse beam of the vehicle body act to strengthen each other. That is, the transverse beam of the vehicle body contributes to strengthening the impact resistance of the battery pack housing in the middle beam direction, and the middle beam itself also increases the strength of the battery pack housing, thereby improving the ability of the battery pack housing to withstand collisions from the side.

The mounting member is a screw including a screw head and a shank, in which the shank extends through the bottom plate, the middle beam and the cover plate in sequence and then protrudes out; the protruding portion is configured to be connected and fixed to the transverse beam of the vehicle body; and the screw head abuts an outer side of the bottom plate to fix the bottom plate, the middle beam and the cover plate.

The battery pack housing further includes a fixing beam provided on a side of the cover plate away from the receiving space, where the mounting member sequentially extends through and fixes the bottom plate, the middle beam, the cover plate and the fixing beam and then protrudes out from the fixing beam; and the protruding portion of the mounting member is configured to be connected and fixed to the transverse beam of the vehicle body.

The mounting member is a screw including a screw head and a shank, in which the shank extends through the bottom plate, the middle beam, the cover plate and the fixing beam in sequence and then protrudes out; the protruding portion is configured to be connected and fixed to the transverse beam of the vehicle body; and the screw head abuts an outer side of the bottom plate to fix the bottom plate, the middle beam, the cover plate and the fixing beam.

The middle beam is made of a metal material, and an insulating layer is attached to the surface of the middle beam.

The middle beam further includes a lead portion located at at least one end along the length direction of the middle beam, and the lead portion is provided with a wire running hole.

An insulating layer is attached to the wall of the wire running hole.

The middle beam further includes a support portion, and the lead portion is located at one end of the support portion. A stop portion is formed at a position where the lead portion and the support portion are joined; and an inner side of the bottom plate is provided with a step engaging with the stop portion.

The width of the lead portion is smaller than the width of the support portion, and a side surface of the lead portion is joined to an end surface of the support portion to form the stop portion.

The step includes two adjacent stop planes. When the middle beam is fixed to the bottom plate, the side surface of the lead portion and the end surface of the support portion respectively abut the two stop planes.

The end surface of the lead portion abuts the corresponding first side beam.

The battery pack housing further includes a fixing beam provided on a side of the cover plate away from the receiving space, where the mounting member sequentially extends through and fixes the bottom plate, the middle beam, the cover plate and the fixing beam and then protrudes out from the fixing beam; and the protruding portion of the mounting member is configured to be connected and fixed to the transverse beam of the vehicle body;

the middle beam further includes a fixing portion protruding from a side of the support portion away from the bottom plate; and the cover plate and the fixing beam are provided with a groove engaging with the fixing portion.

The fixing beam and the cover plate are integrally formed, and the groove is integrally formed at a position where the cover plate and the fixing beam are engaged with the fixing portion.

The plurality of side beams further include two second side beams arranged opposite to each other, where the first side beams and the second side beams are arranged alternately.

The length of the first side beam is greater than the length of the second side beam; and the first side beam is provided with a mounting portion for being mounted and fixed to the vehicle body.

A second aspect of the embodiments of this application also discloses a battery pack, which includes a battery unit, and also any of the battery pack housings as described above, where the battery unit is received in the receiving space.

A third aspect of the embodiments of this application also discloses a vehicle, including a vehicle body and a battery pack as described above.

BRIEF DESCRIPTION OF THE DRAWINGS

These and other aspects and advantages of embodiments of this application will become apparent and more readily appreciated from the following descriptions made with reference to the drawings, in which.

DETAILED DESCRIPTION

The fixing of some conventional battery packs in the vehicle is usually achieved by the screwed connection between a side beam of the tray and the vehicle. The tray generally includes two long side beams and two short side beams arranged on the periphery. Along the front and rear directions of a vehicle body, that is, the direction of travel of the vehicle, the fixation points of the battery pack are distributed on the two short side beams of the tray. In two side directions of the vehicle body, that is, directions roughly perpendicular to the direction of travel of the vehicle, the fixation points of the battery pack are distributed on the two long side beams of the tray. Battery cores are disposed in the central area of the tray. When the battery pack is collided or applied with a force from the side, the long side beam of the tray is depressed inward under the force. As the force increases, the force is gradually transferred to the central battery cores, and the battery cores undergo deformation and leakage under the force. Serious deformation may cause fire and explosion, posing a safety hazard.

The embodiments of this application are described in detail below, and the embodiments described with reference to accompanying drawings are exemplary.

Figure 1:
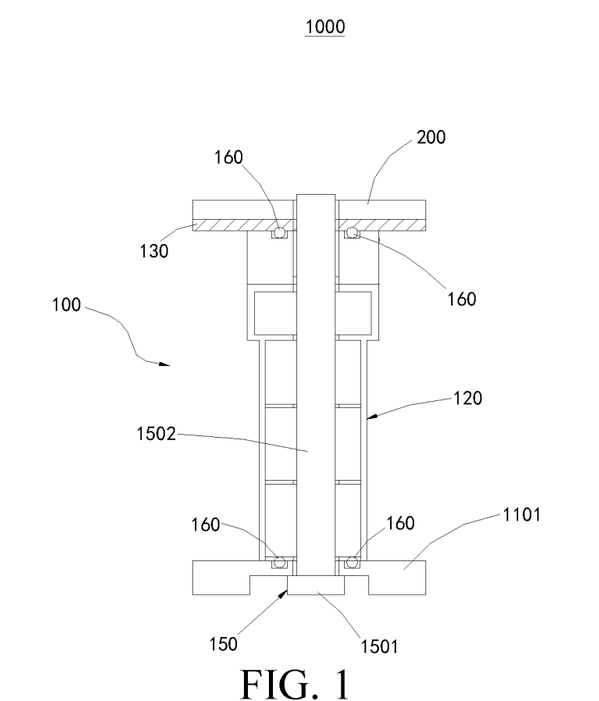
FIG. 1 is a schematic partial cross-sectional view showing the structure of a vehicle according to an embodiment.

As shown in FIG. 1, a vehicle 1000 includes a vehicle body and a battery pack 100. The vehicle body includes a transverse beam 200 of the vehicle body. In a particular embodiment, the vehicle body may further include other components such as a longitudinal beam and a top beam, and the vehicle body may also be understood as a frame of the vehicle 1000. Since this application does not focus on the improvement of the vehicle body, the transverse beam of the vehicle body 200, rather than the whole vehicle body, is shown.

In the vehicle 1000, the battery pack 100 is used as a power source or as one of the power sources. For example, the vehicle 1000 may be an electric vehicle that is powered by the battery pack 100, or the vehicle 1000 may be a hybrid vehicle that is powered by the battery pack 100 and a fuel engine.

Referring also to FIG. 2 to FIG. 5, the battery pack 100 may include a battery pack housing 10 and a battery unit 20, where the battery unit 20 is received in the battery pack housing 10. The battery pack 100 generally includes a plurality of battery units 20, which are connected in series or in parallel to form a power battery capable of providing a predetermined voltage or current.

Figure 2:
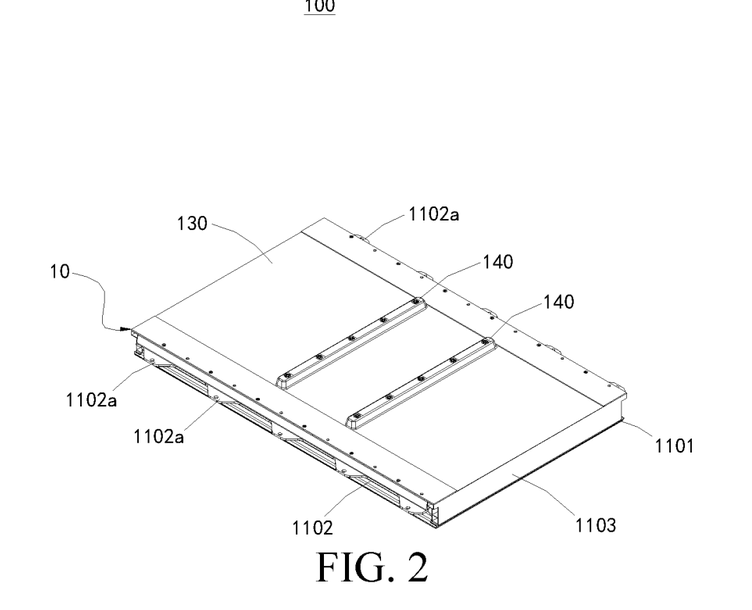
FIG. 2 is a schematic structural diagram of a battery pack according to an embodiment.
Figure 3:
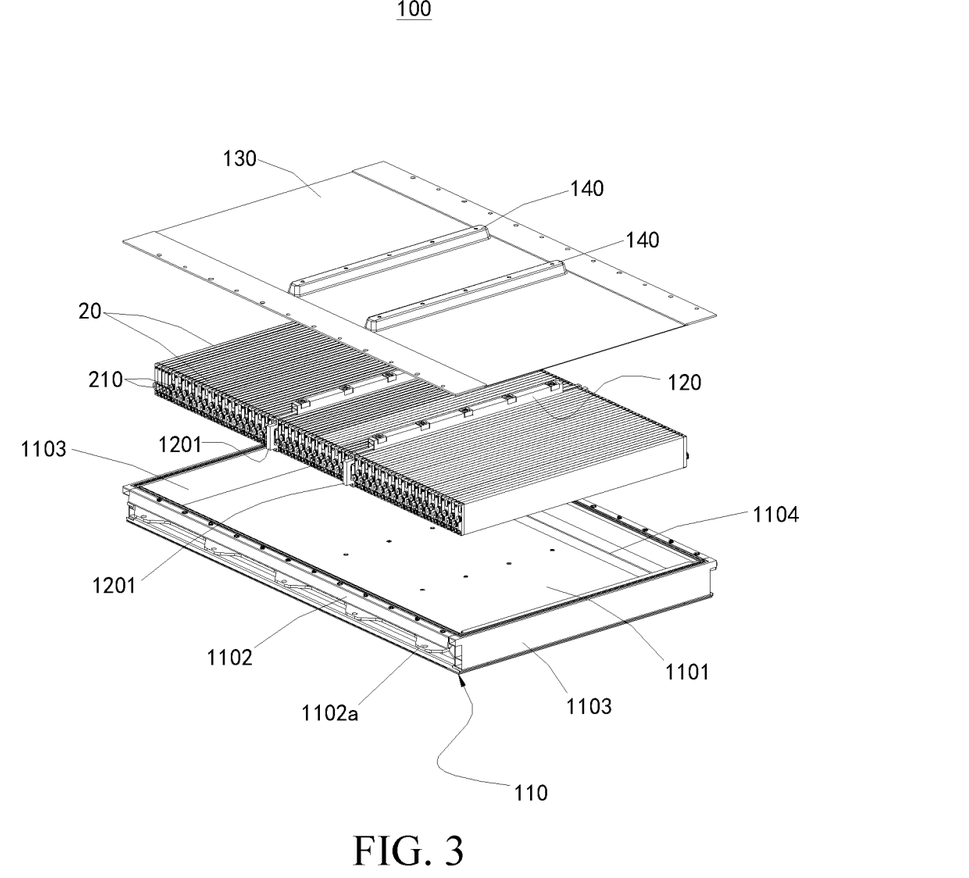
FIG. 3 is an exploded view of the battery pack shown in FIG. 2.

The battery pack housing 10 may include a tray 110, a middle beam 120, a cover plate 130 and a mounting member.

The tray 110 may include a bottom plate 1101 and a plurality of side beams. The plurality of side beams are sequentially connected end to end and engaged to the bottom plate 1101 to form a receiving space having an open side for accommodating the battery unit 20. For example, in a common implementation, the tray 110 may include 4 side beams, and the 4 side beams are sequentially connected end to end to form a quadrilateral. The bottom plate 1101 is disposed at one side of the quadrilateral, such that the quadrilateral is closed at the side and open at the opposite side to form a receiving space inside for accommodating the battery unit 20. The cover plate 130 is configured to close the open side of the receiving space, thereby enclosing the battery unit 20 in the battery pack housing 10 to meet the requirements of water proofing, dust control, and electrical safety.

In some implementations, the number of side beams in the tray 110 can also be set as required. For example, in order to adapt the shape of the tray 110 to the requirements of the mounting space, the number of side beams in the tray 110 can be set to 3, 5, 6 or other integers as needed. Accordingly, the tray 110 may have a regular polygonal shape, a shape that is generally regular, but locally irregular, or an irregular shape. Such variations do not deviate from the concept of this application.

Hereinafter, the description is made with an example in which the tray 110 includes 4 side beams.

The tray 110 includes 4 side beams, including two first side beams 1102. In a specific implementation, the tray 110 may further include two second side beams 1103. The two first side beams 1102 are arranged opposite to each other, the two second side beams 1103 are arranged opposite to each other, and the first side beams 1102 and the second side beams 1103 are arranged alternately and connected end to end in sequence to form a quadrilateral frame with closed peripheral sides. The bottom plate 1101 is arranged at one side of the quadrilateral frame so that the quadrilateral frame is closed at the side. The quadrilateral frame is open at the side away from the bottom plate. In this way, a receiving space which opens on one side is formed inside the quadrilateral frame for accommodating the battery unit 20. The cover plate 130 is configured to close the open side of the receiving space, thereby enclosing the battery unit 20 in the battery pack housing 10.

The middle beam 120 is located in the receiving space. The middle beam 120 includes two opposite ends along its length direction. The two ends of the middle beam 120 along its length direction may be respectively spaced by a predetermined distance from the two first side beams 1102, or the two ends of the middle beam 120 along its length direction may be respectively in contact with the two first side beams 1102. The length of the middle beam 120 is greater than a projection dimension of the battery unit 20 along the length direction of the middle beam 120.

Notably, in the description that "the two ends of the middle beam 120 along its length direction may be respectively spaced by a predetermined distance from the two first side beams 1102", the predetermined distance may be a distance estimated according to the collision, impact and other experiments of the battery pack housing 10, or a distance estimated from a collision and impact strength withstood by the bottom plate 1101 and the side beams in the battery pack housing 10 calculated according to a theoretical model. This aims at enabling the middle beam 120 to strengthen the battery pack housing 10, when the battery pack 100 receives an impact in the length direction of the middle beam 120, or receives an impact having a component in the length direction of the middle beam 120, and the side beams and bottom plate 1101 of the battery pack housing 10 are caused to undergo deformation beyond a predetermined degree. In short, a predetermined distance can be reserved between the two ends of the middle beam 120 along its length direction and the corresponding first side beams 1102. However, the predetermined distance needs to satisfy the condition that when a corresponding first side beam 1102 undergoes a predetermined degree of deformation, a corresponding end of the middle beam 120 along its length direction can be urged against the first side beam 1102 to provide an auxiliary support.

Correspondingly, when the two ends of the middle beam 120 along its length direction are in contact with the corresponding first side beams 1102, the middle beam 120 directly acts to provide an auxiliary strengthening effect when the battery pack housing 10 receives an impact.

It is understandable that in some implementations, one of the two ends of the middle beam 120 along its length direction may be in contact with a corresponding first side beam 1102, and a predetermined distance may be reserved between the other end and the other corresponding first side beam 1102.

The mounting member is configured to sequentially extend through and fix the bottom plate 1101, the middle beam 120 and the cover plate 130, and further configured to be connected and fixed to the transverse beam 200 of the vehicle body.

In the aforementioned battery pack housing 10, battery pack 100 and vehicle 1000, the mounting member extends through the bottom plate 1101, the middle beam 120 and the cover plate 130 of the tray, and is then connected and fixed to the transverse beam 200 of the vehicle body. As such, the middle beam 120 of the battery pack housing 10 and the transverse beam 200 of the vehicle body act to strengthen each other. That is, the transverse beam 200 of the vehicle body contributes to strengthening the impact resistance of the battery pack housing 10 in the length direction of the middle beam 120, and the middle beam 120 itself also increases the strength of the battery pack housing 10, thereby improving the ability of the battery pack housing 10 to withstand collisions from the side. After the middle beam 120 is fixedly connected to the transverse beam 200 of the vehicle body by the mounting member, the transverse beam 200 of the vehicle body is also strengthened, thereby promoting the reduction in the design strength of the transverse beam 200 of the vehicle body and the simplification in the structure of the transverse beam 200 of the vehicle body.

In an implementation, the length of the first side beams 1102 of the four side beams is greater than the length of the second side beams 1103. The battery unit 20 may be a cell or a battery core. The length direction of the battery unit 20 may be set along the length direction of the second side beam 1103. The battery pack 100 usually includes a plurality of battery units 20, and the plurality of battery units 20 are arranged along the length direction of the first side beam 1102.

One or more middle beams 120 may be set according to the size of the battery pack 100, the number of the battery units 20, the overall strength requirement for the battery pack 100, and the position of the fixation point of the battery pack 100 to the vehicle body.

In an implementation, the middle beam 120 can be arranged in parallel with the battery unit 20. The length of the middle beam 120 is set to be greater than the length of the battery unit 20. The two ends of the middle beam 120 along its length direction are in contact with the two first side beams 1102 of the tray 110 respectively. When the battery pack 100 receives a force along the length direction of the middle beam 120, or the battery pack 100 receives an external force having a component along the length direction of the middle beam 120, the first side beam 1102 of the tray 110 is first deformed by the force and thus bears the force as a structural member. As the external force increases, the first side beam 1102 deforms by depressing inwardly, and the force is transmitted to the middle beam 120 which in contact with the first side beam 1102. The middle beam 120, as a force-bearing structural member, resists the influence of the external force on the battery pack 100, to reduce or avoid the external force acting on the battery unit 20 and thus provides a protection for the battery unit 20.

The first side beam 1102 can also be provided with a mounting portion 1102a for being mounted and fixed to the vehicle body, allowing a more stable connection between the battery pack 100 and the vehicle body. Since the plurality of battery units 20 are arranged along the length direction of the first side beam 1102, the deformation of the battery unit 20 in the thickness direction is usually small, and the positions of the battery pack 100 with respect to the second side beams 1103 usually correspond to the head and tail of the vehicle body, a large protection room exists, and generally no direct impact is received. Therefore, the second side beam 1103 may not be provided with a mounting portion.

When one or two ends of the middle beam 120 is/are spaced by a predetermined distance from the first side beam(s) 1102, the length of the middle beam 120 can still be set to be greater than the length of the battery unit 20, and its working mechanism is basically the same as the aforementioned working mechanism, and will not be repeated here.

In some other implementations, the middle beam 120 may not be arranged in parallel with the battery unit 20, that is, the middle beam 120 may form an angle with the battery unit 20. In this case, the length of the middle beam 120 is greater than a projection dimension of the battery unit 20 along the length direction of the middle beam 120. In this manner, it can be ensured that when the battery pack 100 receives a force along the length direction of the middle beam 120, or the battery pack 100 receives an external force having a component along the length direction of the middle beam 120, the first side beam 1102 of the tray 110 is first deformed by the force and thus bears the force as a structural member. As the external force increases, the first side beam 1102 deforms by depressing inwardly, and the force is transmitted to the middle beam 120 in contact therewith, thus providing a protection for the battery unit 20.

When the battery pack 100 includes a plurality of middle beams 120, the plurality of middle beams 120 can be evenly distributed in the receiving space to provide a balanced protection and strengthening effect on each area of the battery pack 100. A seal 160, such as an elastic seal gasket or seal ring, can be arranged between the middle beam 120 and the bottom plate 1101 and the cover plate 130 to ensure the water proofing, dust control, and other performances of the battery pack 100.

Figure 4:
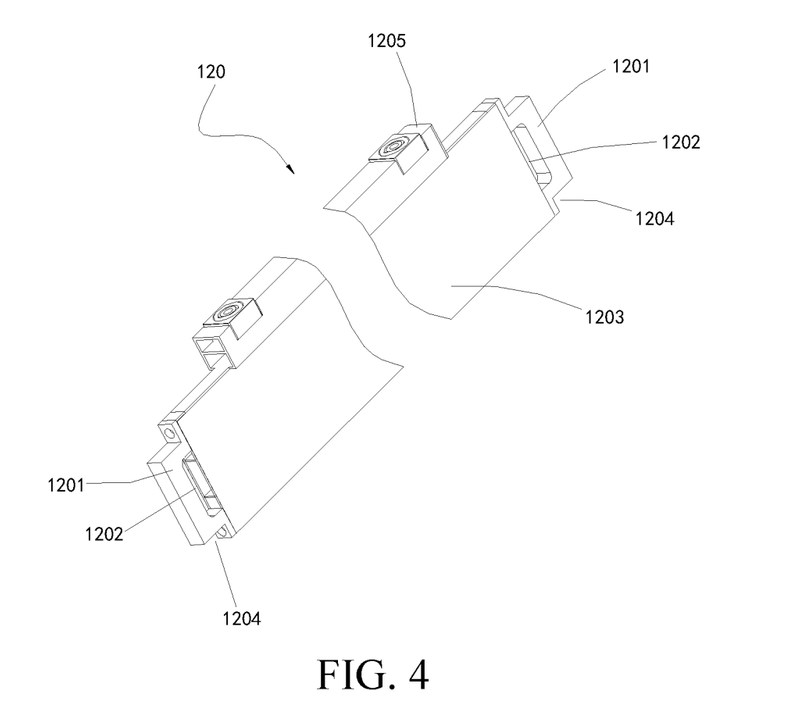
FIG. 4 is a schematic structural diagram of a middle beam in the battery pack shown in FIG. 2.

In a specific implementation, to ensure the strength, the middle beam 120 can be made of a metal material, and an insulating layer is attached to the surface of the middle beam 120. For example, the middle beam 120 can be made of high-strength metal materials such as aluminum alloy and high-strength steel, etc. The surface of the middle beam 120 may be applied with an insulating material (PET film, etc.) or sprayed with an insulating material to realize insulation protection from the battery units 20 at both sides.

Figure 5:
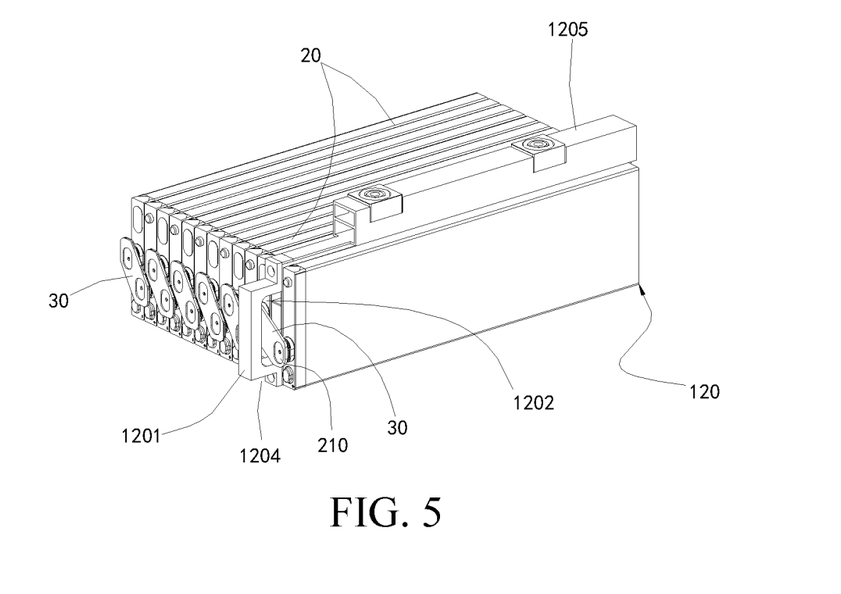
FIG. 5 is a schematic structural diagram of a battery unit, an electrical connector and the middle beam in the battery pack shown in FIG. 2.

In an implementation, the middle beam 120 may also include a lead portion 1201. The lead portion 1201 is located at at least one end of the length direction of the middle beam 120, and the lead portion 1201 is provided with a wire running hole 1202. Correspondingly, the battery unit 20 has an electrode terminal 210. In the battery pack 100, the electrode terminals of the plurality of battery units 20 need to be connected by electrical connectors 30, so as to realize the serial connection, parallel connection or sampling of the plurality of battery units 20. When the battery unit 20 is disposed in the battery pack housing 10, the electrode terminal 210 can be arranged at a side of the battery unit 20 close to the first side beam 1102, so that the electrical connector 30 used to connect the battery units can be passed through a corresponding wire running hole 1202. The lead portion 1201 and the wire running hole 1202 provided on the middle beam 120 not only serve to guide and tidy the electrical connector 30 to facilitate the ordered alignment of wires, but also provide a protection for the electrical connector 30 when the battery pack 100 receives an impact. It should be noted that the form of the electrical connector 30 here is not limited to the form of a high-voltage wiring harness and a low-voltage sampling wiring harness, and may also be in other forms such as electrical connecting flaps.

When the middle beam 120 is made of a metal material, the wall of the wire running hole 1202 can be amenable to an insulation protection treatment by attaching an insulating layer or the like.

In another implementation, the middle beam 120 may further include a support portion 1203, and the lead portion 1201 is located at one end of the support portion 1203. A stop portion 1204 is formed at a position where the lead portion 1201 and the support portion 1203 are joined. For example, the width of the lead portion 1201 can be set to be smaller than the width of the support portion 1203, so the stop portion 1204 is formed at a position where a side surface of the lead portion 1201 is joined to an end surface of the support portion 1203. Correspondingly, an inner side of the bottom plate 1101 is provided with a step 1104 engaging with the stop 1204. The step 1104 includes two adjacent stop planes, where when the middle beam 120 is fixed to the bottom plate 1101, the side surface of the lead portion 1201 and the end surface of the support portion 1203 respectively abut the two stop planes. The end surface of the lead portion 1201 can abut the corresponding first side beam 1102, so that the middle beam 120 exists as a frame of the battery pack 100 and the vehicle, to allow the battery pack 100 itself to have an increased anti-collision strength, vibration mode, and anti-compression ability, and to facilitate the electrical connection of the battery unit 20.

In some implementations, the mounting member may be a screw 150, and the screw 150 includes a screw head 1501 and a shank 1502. The shank 1502 extends through the bottom plate 1101, the middle beam 120 and the cover plate 130 in sequence and then protrudes out; the protruding portion is configured to be connected and fixed to the transverse beam 200 of the vehicle body; and the screw head 1501 abuts an outer side of the bottom plate 1101 to fix the bottom plate 1101, the middle beam 120 and the cover plate 130.

In a specific implementation, the transverse beam 200 of the vehicle body can be provided with a shank hole engaging with the protruding portion of the shank 1502, and the bottom plate 1101, the middle beam 120 and the cover plate 130 can be provided with through holes or shank holes corresponding to the shank 1502 at corresponding positions. When the shank 1502 of the screw 150 extends through the bottom plate 1101, the middle beam 120 and the cover plate 130 and is fixedly connected to the transverse beam 200 of the vehicle body, the screw head 1501 abuts the outer side of the bottom plate 1101, that is, the bottom surface of the bottom plate 1101.

In a specific implementation, the mounting member may be in the form of a rivet or a binding member, such as steel strips, according to the situation of use, as long as it can meet the requirement of fixing the bottom plate 1101, the middle beam 120, and the cover plate 130 and fixing and connecting them to the transverse beam 200 of the vehicle body.

In some specific implementations, the battery pack housing may also include a fixing beam 140. The fixing beam 140 is arranged on a side of the cover plate 130 away from the receiving space to assist in fixing the cover plate 130. Meanwhile, the arrangement of the fixing beam 140 also promote to the increase of the strength of the battery pack 100.

Correspondingly, the mounting member can sequentially extend through and fixes the bottom plate 1101, the middle beam 120, the cover plate 130 and the fixing beam 140, and then protrudes out from the fixing beam 140. The protruding portion of the mounting member is configured to be connected and fixed to the transverse beam 200 of the vehicle body. For example, the mounting member is the screw 150. In this case, the shank 1502 can extend through the bottom plate 1101, the middle beam 120, the cover plate 130 and the fixing beam 140 in sequence and then protrudes out; the protruding portion is configured to be connected and fixed to the transverse beam 200 of the vehicle body; and the screw head 1501 abuts the outer side of the bottom plate 1101 to fix the bottom plate 1101, the middle beam 120, the cover plate 130 and the fixing beam 140.

The middle beam 120 may further include a fixing portion 1205, and the fixing portion 1205 protrudes from a side of the support portion 1203 away from the bottom plate 1101. The cover plate 130 and the fixing beam 140 are provided with a groove engaging with the fixing portion 1205. For example, the fixing beam 140 may be integrally formed with the cover plate 130, and the groove is integrally formed at a position where the cover plate 130 and the fixing beam 140 are engaged with the fixing portion 1205. The cover plate 130 and the fixing beam 140 are engaged with the protruding fixing portion 1205 by means of the groove, to facilitate the positioning and installation of the cover plate 130.

It is understandable that in a specific implementation, the battery pack 100 may also include, for example, at least one of a battery management system (BMS), a battery connector, a battery sampler, and a battery thermal management system, to constitute a power battery pack having power supply management and safety management capabilities, which is not detailed here since it is not the focus of improvement in this application and has been disclosed in related art.

In the description of this specification, the description of the reference terms such as "an embodiment", "some embodiments", "exemplary embodiments", "example", "specific example", or "some examples" means that the specific features, structures, materials or characteristics described with reference to the embodiment or example are included in at least one embodiment or example of this application. In this specification, exemplary descriptions of the foregoing terms do not necessarily refer to the same embodiment or example.

Although the embodiments of this application have been shown and described, a person skilled in the art can understand that changes, alternatives, and modifications can be made in the embodiments without departing from the principle and the purpose of this application, and the scope of this application is as defined by the claims and their equivalents.

What is claimed is:

1. A battery pack housing, for accommodating a battery unit and being mounted to a vehicle body having a transverse beam of the vehicle body, wherein the battery pack housing comprising:
    a tray, comprising
        a bottom plate; and
        a plurality of side beams, where the plurality of side beams are sequentially connected end to end and engaged to the bottom plate to form a receiving space which opens on one side for accommodating the battery unit; and the plurality of side beams comprise two first side beams arranged opposite to each other;
    a middle beam, located in the accommodating space, wherein two ends of the middle beam along a length direction are respectively spaced by a predetermined distance from or in contact with the two first side beams; and the length of the middle beam is greater than a projection dimension of the battery unit along the length direction of the middle beam;
    a cover plate, configured to close an open side of the receiving space; and
    a mounting member, configured to sequentially extend through and fix the bottom plate, the middle beam and the cover plate, and further configured to be connected and fixed to the transverse beam of the vehicle body,
    wherein the middle beam further comprises a lead portion located at at least one end along the length direction of the middle beam, and the lead portion defines a wire running hole.

2. The battery pack housing according to claim 1, wherein the mounting member is a screw comprising a screw head and a shank, wherein
    the shank extends through the bottom plate, the middle beam and the cover plate in sequence and then protrudes out; a protruding portion of the shank is configured to be connected and fixed to the transverse beam of the vehicle body; and the screw head abuts an outer side of the bottom plate to fix the bottom plate, the middle beam and the cover plate.

3. The battery pack housing according to claim 1, further comprising a fixing beam, provided on a side of the cover plate away from the receiving space, wherein
    the mounting member sequentially extends through and fixes the bottom plate, the middle beam, the cover plate and the fixing beam and then protrudes out from the fixing beam; and a protruding portion of the mounting member is configured to be connected and fixed to the transverse beam of the vehicle body.

4. The battery pack housing according to claim 3, wherein the mounting member is a screw comprising a screw head and a shank, wherein
    the shank extends through the bottom plate, the middle beam, the cover plate and the fixing beam in sequence and then protrudes out; the protruding portion is configured to be connected and fixed to the transverse beam of the vehicle body; and the screw head abuts an outer side of the bottom plate to fix the bottom plate, the middle beam, the cover plate and the fixing beam.

5. The battery pack housing according to claim 1, wherein the middle beam is made of a metal material, and an insulating layer is attached to the surface of the middle beam.

6. The battery pack housing according to claim 1, wherein an insulating layer is attached to the wall of the wire running hole.

7. The battery pack housing according to claim 1, wherein the middle beam further comprises a support portion, the lead portion is located at one end of the support portion, and a stop portion is formed at a position where the lead portion and the support portion are joined; and
    an inner side of the bottom plate is provided with a step engaging with the stop portion.

8. The battery pack housing according to claim 7, wherein the width of the lead portion is smaller than the width of the support portion, and a side surface of the lead portion is joined to an end surface of the support portion to form the stop portion; and
    the step includes two adjacent stop planes, wherein when the middle beam is fixed to the bottom plate, the side surface of the lead portion and the end surface of the support portion respectively abut the two stop planes.

9. The battery pack housing according to claim 7, wherein the end surface of the lead portion abuts the corresponding first side beam.

10. The battery pack housing according to claim 7, further comprising a fixing beam provided on a side of the cover plate away from the receiving space, wherein the mounting member sequentially extends through and fixes the bottom plate, the middle beam, the cover plate and the fixing beam and then protrudes out from the fixing beam; and the protruding portion of the mounting member is configured to be connected and fixed to the transverse beam of the vehicle body;
    the middle beam further comprising a fixing portion protruding from a side of the support portion away from the bottom plate; and
    the cover plate and the fixing beam are provided with a groove engaging with the fixing portion.

11. The battery pack housing according to claim 10, wherein the fixing beam and the cover plate are integrally formed, and the groove is integrally formed at a position where the cover plate and the fixing beam are engaged with the fixing portion.

12. The battery pack housing according to claim 1, wherein the plurality of side beams further comprise two second side beams arranged opposite to each other, and the first side beams and the second side beams are arranged alternately.

13. The battery pack housing according to claim 12, wherein the length of the first side beam is greater than the length of the second side beam; and the first side beam is provided with a mounting portion for being mounted and fixed to the vehicle body.

14. A battery pack, comprising a battery unit, and further comprising a battery pack housing according to claim 1, wherein the battery unit is received in the receiving space.

15. A vehicle, comprising a vehicle body, and further comprising a battery pack according to claim 14.

16. The battery pack housing according to claim 2, further comprising a fixing beam, provided on a side of the cover plate away from the receiving space, wherein the mounting member sequentially extends through and fixes the bottom plate, the middle beam, the cover plate and the fixing beam and then protrudes out from the fixing beam; and a protruding portion of the mounting member is configured to be connected and fixed to the transverse beam of the vehicle body.

17. The battery pack housing according to claim 16, wherein the mounting member is a screw comprising a screw head and a shank, wherein the shank extends through the bottom plate, the middle beam, the cover plate and the fixing beam in sequence and then protrudes out; the protruding portion is configured to be connected and fixed to the transverse beam of the vehicle body; and the screw head abuts an outer side of the bottom plate to fix the bottom plate, the middle beam, the cover plate and the fixing beam.

18. The battery pack housing according to claim 17, wherein the middle beam is made of a metal material, and an insulating layer is attached to the surface of the middle beam.

19. The battery pack housing according to claim 18, wherein the middle beam further comprises a lead portion located at at least one end along the length direction of the middle beam, and the lead portion defines a wire running hole.

* * * * *